United States Patent [19]

Buczny et al.

[11] Patent Number: 5,592,466
[45] Date of Patent: Jan. 7, 1997

[54] NETWORK INTERCONNECT BACKUP

[75] Inventors: Frank A. Buczny, Freehold Township, Monmouth County; Mark S. Mui, Middletown, both of N.J.; Doug W. Varney, Naperville, Ill.

[73] Assignee: AT&T, Holmdel, N.J.

[21] Appl. No.: 333,668

[22] Filed: Nov. 3, 1994

[51] Int. Cl.⁶ ............................................. H04J 1/16
[52] U.S. Cl. ......................................... 370/217; 370/384
[58] Field of Search ................................ 370/60, 60.1, 94.1, 370/94.2, 16, 110.1, 100.1, 85.13, 85.1, 68.1, 67, 68, 94.3, 79, 56; 340/827, 825, 825.03, 825.01, 825.02; 379/221, 220, 222, 224, 219, 225, 226, 228, 227, 229, 230–235, 240, 92–97, 279; 395/181, 182.02, 182.01, 182.07, 182.11; 455/8, 9, 58.2

[56] References Cited

U.S. PATENT DOCUMENTS 5,278,823  1/1994  Handel ............................ 370/13
5,317,562  5/1994  Nardin et al. ..................... 370/16

*Primary Examiner*—Douglas W. Olms
*Assistant Examiner*—Dang Ton
*Attorney, Agent, or Firm*—Stephen M. Gurey

[57] ABSTRACT

A system and method for backing up CCS7 call control messages between an IXC network and an LEC network in the event of failures in the CNI-based signaling system of the IXC toll switches. The architecture provides network paths for the LEC's CCS7 call control messages to reach the IXC toll switches with CCS7 signaling isolation, and for control messages from the CCS7-isolated toll switches to reach the LEC's switching offices. Messages from the LEC are routed from an IXC Signal Transfer Point to a Gateway switch. The Gateway switch routes the messages to the isolated victim switch via helper switches using 56 kbps F-links to the victim switch.

24 Claims, 2 Drawing Sheets

5,592,466

NETWORK INTERCONNECT BACKUP

FIELD OF THE INVENTION

The present invention relates to a system for backing up Common Channel Signaling No. 7 (CCS7) call control messages between an Interexchange Carrier (IXC) network and a Local Exchange Carrier (LEC) network in the event of Common Network Interface (CNI) failures in the IXC toll switches.

BACKGROUND OF THE INVENTION

The 4ESS switches in the IXC network are provided with a Common Network Interface (CNI) ring for providing connectivity to the IXC signaling network. CNI provides both Common Channel Interoffice Signaling No. 6 (CCIS6) and CCS7 capabilities for destination routing of signaling messages between nodes within the signaling network. A 4ESS CNI-based signaling system failure may result in signal point isolation. Such signaling isolation of a 4ESS might occur, for example, if there were a CNI ring failure or a failure of both A-links connecting the 4ESS switch to Signaling Transfer Point (STP) mates.

Until recently, failure of the 4ESS CNI-based signaling system was transparent to AT&T customers in the LEC network for two reasons. First, trunk signaling from the LEC network to the 4ESS within the AT&T Switched Network (ASN) were primarily inband multifrequency (MF). Second, the Alternate Signaling Transport Network (ASTN) backed up signaling traffic among 4ESS switches within the ASN. Thus, calls utilizing inband signaling were delivered to the 4ESS switch in the IXC network independently of the state of the CNI-based signaling system interface with backup provided by ASTN for signaling occurring inside the ASN. A similar scenario is applicable to calls egressing from the ASN to the LEC.

The ASTN is an AT&T CCS7 backup network to protect 4ESS switches in the ASN against isolation of intertoll trunk signaling. ASTN is a logically (different software) and physically (different hardware) separate signaling network from the CCS7 network. In the ASTN, the 4ESS toll switches are partially connected by F-links (without the use of an STP). At the two ends of the F-link, the isolated 4ESS is called the "victim" and the aiding backup 4ESS is called the "helper". The ASTN messages carried on the F-links are supported by the LAPB protocol.

Assuming that a 4ESS victim, V, is CCS7 isolated due to the failure of its A-link set and/or CNI, and CCS7 trunks are being established between this isolated switch and another normal 4ESS switch, S, then backup signaling is performed for messages from V to S and from S to V. For messages from V to S, switch V selects a helper, H, and sends ASTN messages to switch H (destined to S) via the F-links. Switch H places the received ASTN messages into a CCS7 envelope and sends them to the destination switch S via the CCS7 signaling network. For messages from S to V, switch S selects one of the victim's helpers H, and sends an ASTN message enveloped with a CCS7 header to H via the CCS7 signaling network. Switch H unwraps the CCS7 header and sends the embedded ASTN message to V via the F-links.

As of the early 1990's, both the IXCs and LECs maintained their own common channel signaling networks. However, at this time, common channel signaling messages were not typically capable of being passed between the IXC and LEC networks. Thus, trunk signaling from LEC switches to the 4ESSs in an IXC network, such as the ASN, was primarily inband MF signaling.

With the advent of out-of-band CCS7 signaling for control of circuit-switched connections between the LECs and the IXCs, there arose the risk that a CNI-based signaling system failure would block calls attempting to enter or leave the ASN. A CNI failure at a 4ESS receiving voice traffic from an LEC End Office (EO) or Access Tandem (AT) will prevent that 4ESS from exchanging the necessary call signaling information with the EO or AT. Moreover, the above-described ASTN cannot backup internetwork signaling in the event of such a failure.

In the 1990–91 time frame, a standard CCS7 interface at the 4ESS switch was studied and proposed for backup signaling when the A-links and/or CNI of the 4ESS fail. This standard interface was known as the Alternate Signaling Interface (ASI).

At the 4ESS switch, the ASI was proposed as a separate CCS7 signaling unit in addition to the normal CNI interface. Standard E-links would be used to connect the ASI of a 4ESS switch to the STP in a remote region. When a 4ESS switch cannot send/receive CCS7 messages via the A-links due to the failure of A-links and/or CNI, the ASI would be turned on, and the E-links carry CCS7 (backup) messages between the 4ESS and the remote STP. The ASI proposal, however, was rejected due to implementation complexity and the high capital costs of E-links at the 4ESS switches.

There is thus the need to protect Network Interconnect (NI) traffic such as SS7 Integrated Services Digital Network User Part (ISUP) traffic in a cost-effective manner. ISUP traffic is used, for example, for call setup and release of CCS7 controlled voice trunks. It has been estimated that the ASN may experience about 20 4ESS isolations (over 5 minutes) per year. This could place millions of calls per year at risk.

SUMMARY OF THE INVENTION

In accordance with the invention, a system and method are provided for backing up network interconnect signaling between first and second networks in the event of toll switch signaling isolation in the second network.

In one embodiment of the invention, the first network includes a first circuit-switched network having a first network switch, and a first signaling network having a first signal transfer point. The second network includes a second circuit-switched network having a plurality of second network switches, and a second signaling network having a second signal transfer point. The second network switches are at least partially interconnected by F-links used for an alternate signaling network to the second signaling network.

At least one of the second network switches is a gateway switch connected to the second signal transfer point by an E-link. Other of the second network switches are capable of functioning as helper switches with respect to a victim switch that is isolated to signaling from the second signal transfer point via the second signaling network.

Signaling information from the first network switch destined for the victim switch is routed along a path including the first signal transfer point via the first signaling network, the second signal transfer point, the gateway switch via the E-link, at least one helper switch via the second signaling network, and finally, the victim switch via at least one of the F-links.

In the preferred embodiment, signaling traffic originating at the victim switch is routed via a helper switch to the second signaling network, to the first signaling network, and then to the first network switch, thereby bypassing the gateway switch.

DESCRIPTION OF THE DRAWINGS

The invention will be described in greater detail below with reference to the attached drawings, of which.

DESCRIPTION OF THE PREFERRED EMBODIMENT

The present invention contemplates an enhancement to the ASTN to provide protection for Network Interconnect ISUP Traffic in the case of a failure of the CNI-based signaling system of a 4ESS switch.

Figure 1:
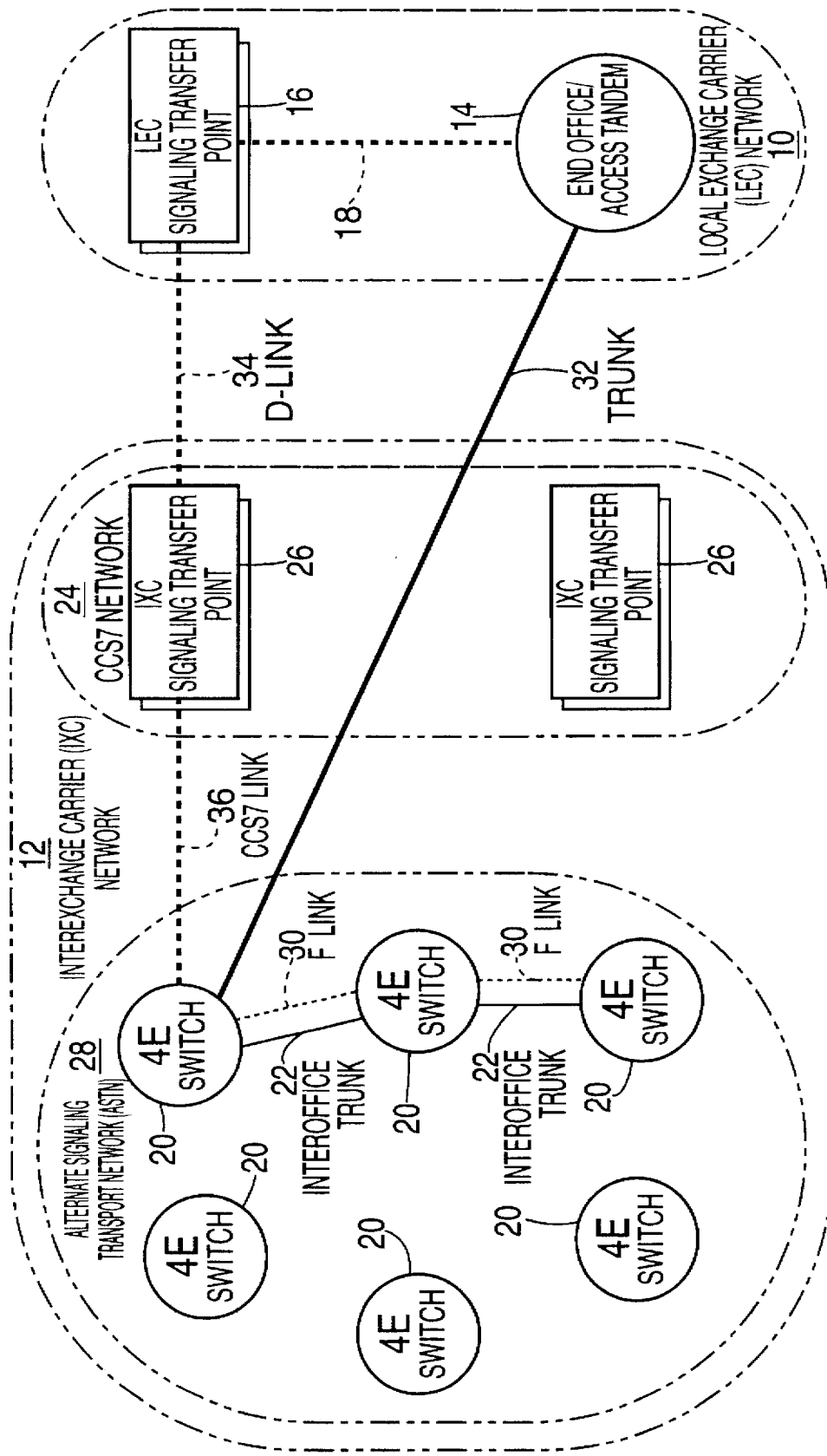
FIG. 1 is a diagram illustrating the IXC and LEC network elements.

FIG. 1 shows the general network architecture of the LEC network 10 and the IXC network 12, in particular the AT&T Switched Network. The LEC network consists of End Offices (EO) or Access Tandems (AT) 14 as well as STPs 16 for CCS7 signaling transmitted over CCS7 links 18. The IXC network 12 consists of intertoll switches 20 such as the 4ESS switch. These toll switches 20 transmit voice and data over interoffice trunks 22. Signaling traffic, such as for call setup and release, is sent over the CCS7 network 24 via STPs 26. Moreover, in the event of CNI failures in the switches 20, the ASN provides ASTN 28 backup for the signaling information. In particular, the 4ESS switches 20 are directly connected by F-links 30 for transmitting signaling information from 4ESS-to-4ESS within the ASN.

Voice and data traffic from the LEC network 10 is sent to a 4ESS in the IXC network 12 via trunk 32. ISUP traffic (e.g., for setting up trunk 32) is sent via CCS7 link 18 to an STP 16, and then to an IXC STP 26 via D-link 34. The ISUP traffic reaches its destination 4ESS over CCS7 link 36. However, in the event of a CNI-based failure at the destination 4ESS, no ISUP traffic will be able to reach the 4ESS over link 36.

In the system of the present invention, a 4ESS switch in the ASN is provided with ASTN enhancement feature software to allow the 4ESS to serve the function of an ASTN Gateway. During the failure of a CNI-based signaling system at a destination 4ESS in the ASN, the ASTN Gateway accepts ISUP messages from the CCS7 network, translates the messages into ASTN format, and forwards them to the destination 4ESS using the ASTN. During non-failure conditions the ASTN Gateway functionality would be idle but capable of responding automatically to failure situations. The Gateway 4ESS switch has a normal peak load of preferably less than 40% of real-time capacity.

Figure 2:
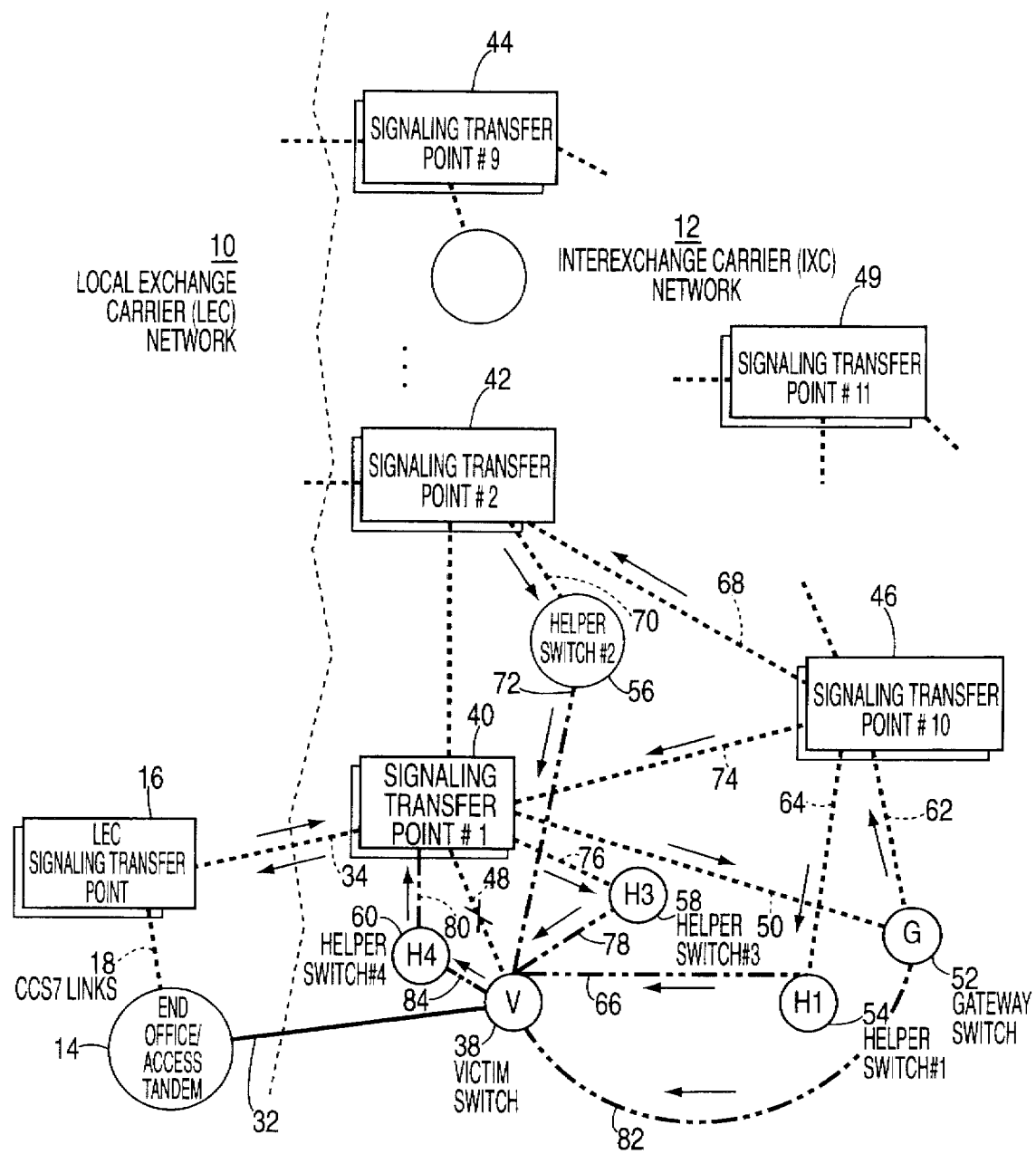
FIG. 2 is a diagram illustrating an example of the network architecture used for NI signaling backup.

Referring to FIG. 2, there is shown the network architecture for NI signaling backup and an example of one possible signal flow scenario that may occur in the event of a CNI-based signaling system failure. The End Office or Access Tandem 14 communicates voice or data traffic over CCS7 controlled trunk 32 with the destination 4ESS switch 38 in the IXC network 12 (i.e., the ASN). However, because the switch 38 has a CNI failure it experiences CCS7 signaling isolation and is referred to as the "victim" switch. Note that a CNI failure occurs independently of the other functionality of a 4ESS switch.

ISUP signaling messages related to the call on trunk 32 are sent from EO/AT 14 to LEC STP 16 via CCS7 link 18. LEC STP 16 routes the message to STP1 40 in the IXC network 12 via D-link 34. The IXC's CCS7 network 24 is composed of various links and nodes including, for example, STP1 40, STP2 42, STP9 44, STP10 46, and STP11 49 which are preferably No. 2A STPs.

CCS7 link 48 between STP1 40 and the victim 38, cannot be used to transmit ISUP traffic because of the CNI failure. However, such failure is detected by STP1 40 which is provided an Alternate Link Set Routing (ALSR) capability. ALSR allows STPs in the IXC network 12 to route signaling traffic to a different location upon failure of the primary location. The STP, for example, has a routing table providing information on possible outgoing routes. When the primary (A-link) and secondary (C-link) routes are not available during CNI signaling isolation, the third route in the table is selected. This third route is an E-link 50 connecting the STP to the 4ESS switch functioning as an ASTN Gateway 52.

In the preferred embodiment, each STP region R has a unique 4ESS Gateway 52 which backs up the 4ESS switches in that region R. This 4ESS Gateway preferably resides in a remote STP region, i.e., it has A-links connected to the STPs not in region R, and connects to the STPs in region R by an E-link set. Therefore, for the eleven STP regions in the AT&T signaling network, there are eleven unique 4ESS Gateways and eleven distinct E-link sets.

The purpose of using E-links is to physically separate the normal NI incoming traffic destined to the 4ESS Gateway which serves as a normal toll switch and the NI backup traffic (destined to the victim switch via the 4ESS Gateway). In FIG. 2, the normal incoming NI traffic traverses through STP1, B-link 74, STP10, A-link 62 and 4ESS Gateway 52, while the NI backup traffic goes through STP1, E-link 50 and 4ESS Gateway 52. To prevent overload at the Gateway due to a high volume of NI backup traffic, MTP procedures are applied at the STP (on the E-links) to throttle backup traffic. In the worst case scenario, the craft personnel can take the E-links out of service, disabling the NI backup capability. If there is no separation of normal and backup traffic (to the Gateway), both types of traffic will be affected due to a high volume of NI backup traffic.

Upon CNI failure of the victim 38, STP1 40 routes ISUP traffic via E-link 50 to ASTN Gateway 52. The ASTN Gateway 4ESS accepts the incoming ISUP messages and converts them into an ASTN format (for example X.25 or any other messaging format that may be transported by a backup signaling network) embedded in a CCS7 envelope. The messages are then transmitted over a CCS7 link to a 4ESS switch in the ASN known as a "helper" switch because of its functionality in helping to backup the CCS7 signaling of the victim switch. The ASTN Gateway also selects the particular helper(s) to be used for routing the messages to the victim. Such helper(s) may reside in the STP region of the ASTN Gateway, the STP region of the victim switch, or in another STP region.

The helper switch(es) receives the ISUP messages from the Gateway switch over the SS7 signaling network, strips out the ASTN formatted messages, and transmits them to the victim switch via the ASTN. Thus, a 4ESS node experiencing a CNI failure is backed up by the provision of an alternative signaling route.

As a possible additional feature, when the ASTN Gateway is situated sufficiently near to the victim switch, messages may be directly routed to the victim over the ASTN (i.e., where the Gateway and victim are directly connected by a F-link). Such a situation would only arise in a small percentage of cases.

For outgoing NI traffic from the victim toward the EO or AT in the LEC, the process may simply flow in the reverse direction. However, in the preferred embodiment, the victim switch sends the relevant messages to the helper(s), residing preferably in the same STP region as the victim, via the ASTN. The helper switch, in turn, reformats the ISUP messages and sends them to the LEC via the CCS7 network. Thus, the ASTN Gateway switch is not used for outgoing messages, thereby reducing the traffic load on the Gateway and the overall delay in the system.

Referring again to the example of FIG. 2, three helper switches H1 54, H2 56, and H3 58 are used for load sharing incoming traffic to the victim 38 and one helper switch H4 60 is used for outgoing traffic to the EO/AT 14.

Gateway 52 routes an ISUP message to H1 54 via CCS7 link 62, STP10 46, and CCS7 link 64. H1 reformats the message and transmits it to the victim over F-link 66 of the ASTN. Gateway 52 also routes ISUP messages to H2 56 via CCS7 link 62, STP10 46, CCS7 link 68, STP2 42 and CCS7 Link 70. H2 reformats the message and transmits it to the victim over F-link 72 of the ASTN. To complete the three-way load sharing, Gateway 52 routes ISUP messages to H3 58 via CCS7 link 62, STP10 46, CCS7 link 74, STP1 40, and CCS7 link 76. H3 reformats the message and sends it to the victim over F-link 78.

As mentioned previously, the victim switch may be located in sufficient proximity to the Gateway that they are actually connected by a F-link. In such a case, the Gateway switch 52 may directly route ISUP messages via ASTN F-link 82 without the need for an intermediate helper switch.

In the outgoing direction, the victim 38 routes messages to H4 60 via F-link 84. The helper switch reformats them for transmission via CCS7 link 80 to STP1 40. STP1, in turn, sends the messages to the LEC STP 16 over CCS7 link 34. Finally, the LEC STP routes the messages to the EO or AT 14. FIG. 2 shows the victim using only H4 60 for outgoing traffic. Preferably however, multiple-helper load sharing is used so that all four helpers H1–H4 are used for incoming and outgoing traffic.

Once the failed 4ESS CNI signaling system has returned to normal operation the STPs will automatically begin sending the messages to the recovered 4ESS switch CNI signaling system using the normal signaling route to the CCS7 interface. The 4ESS Gateway is preferably able to backup NI traffic, depending upon its E-link capacity, in the event of up to two simultaneous 4ESS/CNI isolations in the victim STP region. If each of the eleven STP regions is supported by one 4ESS Gateway, the architecture should be able to handle up to twenty-two simultaneous isolations.

A 4ESS switch enhanced to perform as a Gateway node 52 possesses a variety of capabilities many of which are implemented in node software. For example, the Gateway detects the isolation of a victim switch(es). Such detection occurs upon receipt of call setup or release messages over an E-link. The E-link usually only carries maintenance signals.

The Gateway 52 also accepts and formats incoming NI ISUP messages into the user data field of CCS7 messages. During reformatting, all parameters of the incoming ISUP message (up to 255 octets) should be retained. The Gateway can then route the converted CCS7 messages to the victim via the helper(s) in the ASTN.

The Gateway 52 is also capable of activating the CCS7 Signaling Network Management (SNM) control via the E-link during isolation of the victim switch(es). SNM functions provide network control in the case of signaling link or signaling point failures, and control traffic in the case of congestion or blockage (e.g., if the F-links are congested).

The Gateway 52 maintains relevant ASTN status tables (concerning routing to the victim). Thus, the Gateway is able to apply the appropriate SNM procedures via the E-link in case of congestion in the ASTN or unavailability of the victim switch(es).

In particular, the Gateway can send Transfer Controlled (TFC) or Transfer Prohibited (TFP) messages concerning the victim switch via the E-link in case of congestion in the ASTN or unavailability of the victim switch. The Gateway can receive/intercept Route Set Congestion Test (RCT) or Route Set Prohibited Test (RSP) messages, concerning the victim switch, from the E-link in case of congestion in the ASTN or unavailability of the victim switch. The Gateway can also apply the appropriate TFC flow control or Transfer Allowed (TFA) procedures via the E-link when the congestion in the ASTN abates or the victim switch(es) become available. The Gateway 52 is able to deactivate the CCS7 SNM control via the E-link after recovery of the victim switch(es).

The Gateway 52 maintains relevant Message Transfer Part (MTP) status tables concerning the related EOs/ATs. Thus, the Gateway is able to apply the appropriate SNM procedures via the E-link in case of congestion in the LEC CCS7 network or unavailability of the LEC's EO(s) or AT(s).

In particular, the 4ESS Gateway applies the congestion control procedures to the victim switch(es) in the event of congestion in the LEC CCS7 network. The victim(s) can only send outgoing NI CCS7 messages at a specified priority level depending on the degree of congestion in the LEC CCS7 network, and can resume normal outgoing NI traffic when the congestion abates.

Upon detecting the unavailability of the LEC's EO(s) or AT(s) by receiving Transfer Prohibited (TFP) or Transfer Cluster Prohibited (TCP) messages via the A-link, the helper switch(es) instructs the victim switch(es) to halt the outgoing NI traffic destined to the concerned EO(s) or AT(s). When the EO(s) or AT(s) becomes available, Transfer Allowed (TFA) or Transfer Cluster Allowed (TCA) messages are received by the helper switch(es) via the A-links, and the helper switch(es) instructs the victim switch(es) to resume normal outgoing NI traffic.

The enhanced ASTN of the present invention, consisting of the victim, helper(s), and interconnecting F-links, also possesses various capabilities. F-links, for example, should operate at 56 kbps capacity. Victim switches have routing/status tables in order for them to route the NI outgoing CCS7 messages to the LEC via the helper(s). Helper switch(es) can format the NI outgoing CCS7 messages (from the victim) into ISUP messages, and route them to the LEC's EO or AT via the A-link to the helper's home STP. The helper(s) also maintain relevant MTP route/status tables concerning the related EOs/ATs. Finally, the Originating Point Code (OPC) of the outgoing ISUP message should be the point code of the victim (not that of the helper). All CCS7 related parameters in the ASTN message (from the victim switch) are converted to those of the ISUP message at the helper switch(es).

In the system of the present invention, each STP has ALSR or alternate routing capability. When the NI incoming ISUP messages destined to the victim switch arrive at the STP, it is able to route these messages to the 4ESS Gateway via the E-link. In order to have enough capacity to handle NI outgoing traffic (from the helpers), A-link layers should be added from the 4ESS switches to their home STP.

In this disclosure there is shown and described the preferred embodiment of the invention, it being understood that the invention is capable of use in various other combinations and environments and is capable of changes or modifications within the scope of the inventive concepts as expressed herein.

We claim:

1. A backup signaling network for backing up network interconnect signaling between a first network and a second network, comprising:

said first network including:

a first circuit-switched network having a first network switch; and a first signaling network, supporting said first circuit-switched network, having a first signal transfer point;

said second network including:

a second circuit-switched network having a plurality of second network switches; and a second signaling network, supporting said second circuit-switched network, having a second signal transfer point;

wherein said second network switches are at least partially interconnected by F-links used for an alternate signaling network to said second signaling network;

wherein at least one of said second network switches is a gateway switch connected to said second signal transfer point by a communication link, and other of said second network switches are capable of functioning as helper switches with respect to a victim switch that is isolated to signaling from said second signal transfer point via said second signaling network;

where signaling information from said first network switch destined for said victim switch is routed along a path including said first signal transfer point via said first signaling network, said second signal transfer point, said gateway switch via said communication link, at least one helper switch via said second signaling network, and said victim switch via at least one of said F-links.

2. The backup signaling network of claim 1, wherein said gateway switch selects said at least one helper switch for routing said signaling information to said victim switch.

3. The backup signaling network of claim 2, wherein said gateway switch selects multiple helper switches to load share signaling information destined to said victim switch.

4. The backup signaling network of claim 2, wherein said communication link is an E-link.

5. The backup signaling network of claim 4, wherein said second signal transfer point has alternate link set routing capability for routing said signaling information to said gateway switch via said E-link in the event of signaling isolation of said victim switch.

6. The backup signaling network of claim 5, wherein said gateway switch formats said signaling information into a form suitable for transmission over said F-links and embeds said formatted signaling information in a CCS7 envelope for transmission in said second signaling network.

7. The backup signaling network of claim 6, wherein signaling information transmitted via said first signaling network includes ISUP messages.

8. The backup signaling network of claim 2, wherein said gateway switch is capable of directly routing said signaling information to said victim switch via an F-link without the use of said at least one helper switch.

9. The backup signaling network of claim 2, wherein said victim switch isolation is due to a CNI ring failure or an A-link set failure.

10. The backup signaling network of claim 4, wherein signal transfer point regions in said second network have assigned gateway switches, with each assigned gateway switch residing outside of and connected by E-link to its assigned signal transfer point region.

11. The backup signaling network of claim 2, wherein signaling traffic from said victim switch in said second network destined to said first network switch in said first network is routed along a path that includes a reverse flow helper switch via F-link, said second signal transfer point via said second signaling network, said first signal transfer point, and said first network switch via said first signaling network, wherein said gateway switch is bypassed.

12. A system for backing up CCS7 messages between a first network and a second network, comprising:

said first network including:

a first circuit-switched network; and a first CCS7 signaling network;

said second network including:

a second circuit-switched network having a plurality of network switches;

a second CCS7 signaling network connected to said network switches; and an alternate signaling network including F-links connected to said network switches;

at least one of said network switches configured to function as a gateway switch;

a plurality of said network switches configured to function as helper switches for providing alternative routing to a CCS7 isolated network switch;

a signal transfer point, in said second CCS7 signaling network, for routing signaling information received from said first CCS7 signaling network to said gateway switch via an E-link in the event of CCS7 signaling isolation;

wherein said gateway switch includes a processor adapted to select at least one of said helper switches for routing said signaling information to said CCS7 isolated network switch; and where said signaling information is routed from said gateway switch along a path including said at least one of said helper switches via said second CCS7 signaling network and said CCS7 isolated network switch via at least one of said F-links.

13. The system of claim 12, wherein said first network is a local exchange carrier network and said second network is an interexchange carrier network.

14. The system of claim 12, wherein said F-links utilize an LAPB protocol and have a capacity of at least 56 kbps.

15. The system of claim 12, wherein signaling traffic from said CCS7 isolated network switch toward said first CCS7 signaling network bypasses said gateway switch.

16. The system of claim 12, wherein said signal transfer point automatically begins routing messages via a normal signaling route to said CCS7 isolated network switch upon its recovery from CCS7 signaling isolation.

17. A method for backing up network interconnect signaling between a first network and a second network, said first network having a first circuit-switched network and a first signaling network, and said second network having a second circuit-switched network, a second signaling network and an alternate signaling network, comprising the steps of:

routing signaling information destined for a victim switch, in said second circuit-switched network, from said first signaling network to a signal transfer point in said second signaling network;

said signal transfer point referring to a routing table to determine an alternate route including an E-link;

routing said signaling information from said signal transfer point to a gateway switch via said E-link;

said gateway switch determining at least one helper switch;

said gateway switch routing said signaling information to said at least one helper switch via said second signaling network; and said helper switch routing said signaling information to said victim switch via said alternate signaling network.

18. The method of claim 17, further including the step of said helper switch routing said signaling information from said victim switch to said first circuit-switched network, via said second signaling network and said first signaling network.

19. The method of claim 17, wherein said alternate signaling network includes F-links directly interconnecting network switches in said second circuit-switched network.

20. The method of claim 17, further comprising the step of:

said gateway switch sending signaling network management control messages toward said first signaling network via said E-link in case of congestion in said alternate signaling network or unavailability of said victim switch.

21. The method of claim 17, further comprising the steps of:

said gateway switch receiving signaling network management control messages via said E-link in case of congestion in said first signaling network; and said gateway switch informing said victim switch.

22. The method of claim 17, further comprising the step of:

said helper switch informing said victim switch in case of unavailability of a switching office in said first circuit-switched network.

23. The method of claim 17, further comprising the step of:

routing signaling traffic from said victim switch toward said first signaling network so as to bypass said gateway switch.

24. The method of claim 17, further comprising the step of:

said gateway switch load sharing said signaling information among a plurality of helper switches.

* * * * *